3,470,222
PHOSPHORUS- AND METAL-CONTAINING COMPOSITION AND PREPARATIONS THEREOF
Thomas C. Jennings, Willowick, Ohio, assignor to The Lubrizol Corporation, Wickliffe, Ohio, a corporation of Ohio
No Drawing. Continuation-in-part of application Ser. No. 493,240, Oct. 5, 1965. This application July 18, 1966, Ser. No. 565,740
Int. Cl. C07f 9/08; C09k 3/10; C09d 5/04
U.S. Cl. 260—429.9                                    9 Claims

ABSTRACT OF THE DISCLOSURE

Products suitable for use in caulking compositions, paints, drawing compositions, etc., may be prepared by the reaction of phosphoric acid, an organic epoxide and a metal base.

---

This application is a continuation-in-part of copending application Ser. No. 493,240, filed Oct. 5, 1965 and now abandoned.

This invention relates to new compositions of matter and methods for their preparation. More particularly, it relates to compositions which are prepared by (1) reacting one mole of phosphoric acid with up to about 5 equivalents of an organic epoxide and (2) reacting the product thus formed with about 0.4–2.0 equivalents of a metal base. In a preferred embodiment, the ratio of moles of phosphoric acid to equivalents of epoxide is about 1:1 and the ratio of moles of this product to equivalents of metal base is also about 1:1.

While the precise constitution of the products formed by this reaction sequence is not known, a study of the literature relating to analogous reactions and of the chemical properties of the products, especially their neutralization numbers, has led to several conclusions. In the first place, the epoxide usually reacts as though it were a dimer. Thus, the initial stage in the reaction of phosphoric acid with propylene oxide may be represented as follows.

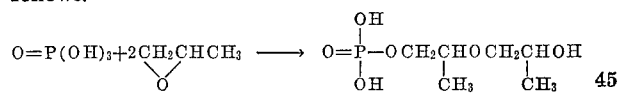

In the second place, the product of the first step of the reaction sequence of this invention is a mixture of unreacted phosphoric acid and the mono-, di- and tri-esters thereof. The composition of this mixture has been determined for various molar ratios of epoxide to phosphoric acid, from the neutralization numbers of the product using bromphenol blue and phenolphthalein indicators. (The first of these is acidic and changes color after the first acidic hydrogen of phosphoric acid has been titrated; the second is moderately basic and changes color after titration of the second hydrogen.) These compositions are given in the following table.

| Molar ratio, epoxide:H₃PO₄ | Mole percent | | | |
|---|---|---|---|---|
| | H₃PO₄ | Monoester | Diester | Triester |
| 1:1 | 67 | 22 | 5 | 6 |
| 2:1 | 44 | 29 | 10 | 17 |
| 3:1 | 28.5 | 25 | 14.5 | 32 |
| 4:1 | 14.5 | 18 | 20 | 47.5 |
| 5:1 | 3 | 11 | 19 | 67 |

In the third place, the reaction of the phosphoric acid-epoxide product with the metal base frequently produces a product in which only a small amount of metal is incorporated in the composition. While a metal content of at least 5% is preferred, the percentage may be as low as about 0.2%.

Based on the findings described above, the present invention is still more specifically directed to compounds and mixtures of compounds of the general formula

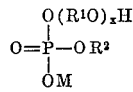

wherein $R^1$ is a substituted or unsubstituted ethylene radical; $R^2$ is hydrogen, a metal cation or $(R^1O)_xH$; M is one equivalent of a metal cation; and $x$ is an integer from 1 to about 5. The preferred compounds of this class are those having the formula

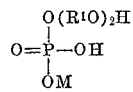

wherein $R^1$ and M are as defined above.

The preparation of the compositions of the present invention is effected in a two-step reaction, the first step being the formation of the phosphoric acid-epoxide reaction product and the second being its reaction with the metal base. For the first step, it is preferred to use concentrated phosphoric acid, typically 85% or greater and desirably about 100%. Phospholeum (phosphoric acid of greater than 100% concentration) is also suitable.

The term "epoxide," as used herein, refers to any compound containing at least one oxirane (oxacyclopropane) ring. The epoxide may also contain other functional groups, provided they do not interfere with the reaction of this invention and do not decompose under these reaction conditions. Thus, the epoxide may be an aliphatic one such as ethylene, propylene or butylene oxide; an aromatic one such as styrene, o-methylstyrene or p-chlorostyrene oxide; an ether such as allyl glycidyl ether, or a polymer thereof; an epoxy resin of the type which results from the reaction of epichlorohydrin with Bisphenol A, said resin having terminal epoxy groups; or the like. The preferred epoxides are the aliphatic ones, especially propylene oxide. With reference to epoxides, the term "equivalent" is a number of grams or other weight units equal to the molecular weight of the epoxide divided by the number of epoxy groups per molecule.

The reaction between phosphoric acid and the epoxide is exothermic, and is best controlled by adding the epoxide gradually to the phosphoric acid. Ordinarily, no external heating is required; the reaction may be carried out starting at ambient temperature and the temperature gradually increases during the epoxide addition until it reaches about 70–90° C. If the reaction is slow in starting at room temperature, external heat may be applied. The use of a solvent is ordinarily not necessary, but in certain instances solvents may be used. Ordinarily, up to about 5 equivalents and preferably about 1–2.5 moles of the epoxide is added per mole of phosphoric acid.

The second step of the process, in which the phosphoric acid-epoxide product is reacted with a metal base, is preferably effected at a temperature between about 40° C. and 80° C. Suitable metal bases include, for example, the oxides, hydroxides, carbonates, bicarbonates, alkoxides, phenates, sulfides, and similar compounds. The most suitable metals are the alkaline earth and transition metals, especially zinc, magnesium, manganese, cadmium, aluminum, iron and tin; but alkali metals (especially lithium) may also be used. Zinc is the preferred metal. The metal base may be added to the reaction mixture all at once, or it may be added gradually so as to maintain more accurate control of the reaction rate and temperature. For each mole of phosphoric acid used in preparation of the epoxide-phosphoric acid reaction product, about 0.4–2.0 equivalents of metal base is used; preferably, the ratio of equivalents of metal base to moles of phosphoric acid is between about 0.8:1 and 1:1. The reaction may be effected in the presence or absence of a solvent, but solvents are preferably used, especially oxygenated organic compounds such as alcohols, ethers, ketones, ether alcohols and the like. Specific examples of suitable solvents are ethylene glycol monobutyl ether, 1-hexanol, 4-methyl-2-pentanol, diethylene glycol, dioxane, mixtures thereof with aromatic hydrocarbons such as toluene or xylene, and the like.

After the metal base has completely dissolved in the reaction mixture, it is preferred that water be removed by heating said mixture to about 110–180° C. Water removal may be promoted by reducing the pressure or purging the system with an inert gas such as nitrogen. While removal of water is preferred, it is not necessary and the mixture may often be used without removal of water. In most cases, however, insoluble residues in the reaction mixture should be removed by filtration or the like before use.

The following examples illustrate methods of preparation of the compositions of this invention.

EXAMPLE 1

To 2940 grams (30 moles) of 100% phosphoric acid is added, over 2½ hours, 1740 grams (30 moles) of propylene oxide. The temperature rises to 50° C. as the propylene oxide addition is commenced and is held to 50–60° C. during the addition by means of a cold water bath. After the addition of the propylene oxide, the mixture is heated for one-half hour at 65–70° C.

To 2340 grams of the propylene oxide-phosphoric acid reaction product thus prepared, at 60° C., is added 610 grams (15 equivalents) of zinc oxide over one-half hour. The temperature rises to 115° C. during the zinc oxide addition. The mixture is heated to 128–138° C. and purged with nitrogen for six hours. During this period, water is evolved from the reaction mixture; the total amount of water recovered is 133 ml. After water removal is complete, 1875 grams of ethylene glycol monobutyl ether is added over ten minutes. The mixture is stirred for 15 minutes and allowed to stand overnight. Finally, filter aid (2% by weight) is added and the solution is filtered.

The product is a 60% ethylene glycol monobutyl ether solution of the compound having a propylene oxide (moles):phosphoric acid (moles):zinc oxide (equivalents) ratio of 1.0:1.0:0.5; it contains 10.6% zinc and 10.1% phosphorus.

EXAMPLE 2

A 50% solution in ethylene glycol monobutyl ether of a propylene oxide-phosphoric acid-zinc oxide reaction product is prepared according to the method of Example 1, except that water is not removed and the maximum temperature of the reaction mixture is 67° C. After the addition of the salt, the mixture is stirred at 67° C. for six hours in order to complete dissolution of the zinc oxide. The product contains 8.45% zinc and 7.53% phosphorus, and becomes hazy on standing.

EXAMPLE 3

A solution of 780 grams (5.0 moles) of a 1:1 propylene oxide-phosphoric acid reaction product, prepared according to the method described in Example 1, in 939 grams of 1-hexanol is heated to 50° C. and 204 grams (5.0 equivalents) of zinc oxide is added over a 5-minute period. The solution is heated at 130° C. (reflux temperature) for 20 minutes and the water evolved (29 ml.) is collected in a trap. After the water has been removed, filter aid (3% by weight) is added to the solution which is then cooled and filtered. The product is obtained as a 50% solution in 1-hexanol; it has a zinc content of 7.95% and a phosphorus content of 8.20%.

EXAMPLE 4

The procedure of Example 3 is repeated, except that the ratio of moles of the propylene oxide-phosphoric acid reaction product to equivalents of zinc oxide is 1:0.91 and the solvent is 4-methyl-2-pentanol, which is present in an amount sufficient to form a 50% solution of the product.

EXAMPLE 5

Eight hundred grams of the product of Example 4 and 400 grams of diethylene glycol are mixed and heated for two hours at 145° C., while purging with nitrogen. The 4-methyl-2-pentanol is removed by evaporation and the residue is the desired 50% solution of the product in diethylene glycol.

EXAMPLE 6

A solution of 163 grams (4.0 equivalents) of zinc oxide in 415 grams of a 4:1 (by weight) mixture of 1-hexanol and toluene is heated to 50° C., and a solution of 624 grams (4.0 moles) of a 1:1 propylene oxide-phosphoric acid addition product in 336 grams of the 1-hexanol-toluene solvent is added over one hour, with stirring. The reaction mixture is heated to 115–130° C. and purged with nitrogen, 36 ml. of water being thus removed. It is then cooled to 100° C., and 30 grams of filter aid is added. The mixture is further cooled to 80° C. and filtered. There is obtained a 50% solution of the reaction product which contains 8.65% zinc and 7.69% phosphorus.

EXAMPLE 7

The procedure of Example 6 is repeated, except that the solvent is diethylene glycol. A 50% solution of the product is obtained.

EXAMPLE 8

To 980 grams (10.0 moles) of 100% phosphoric acid, at 50–60° C., is added 580 grams (10.0 moles) of propylene oxide. The mixture is stirred for one hour, after which 1810 grams of 4-methyl-2-pentanol is added. The solution is then heated to 55° C. and 342 grams (9.64 equivalents) of zinc oxide is added over ten minutes. The reaction mixture is heated to 110–128° C. and purged with nitrogen for three hours; 68 ml. of water is thus recovered by distillation. After standing overnight, the mixture is heated to 128° C. and purged for an additional two hours with nitrogen; an additional 19 ml. of water is thus obtained. The mixture is then cooled and filtered (with the addition of 2% filter aid). The product, a 50% solution in 4-methyl-2-pentanol, contains 7.70% zinc and 8.30% phosphorus.

EXAMPLE 9

Following the procedure of Example 3, a propylene oxide-phosphoric acid-zinc oxide adduct is made from 490 grams (5.0 moles) of phosphoric acid, 218 grams (3.75 moles) of propylene oxide, 204 grams (5.0 equivalents) of zinc oxide and 867 grams of 1-hexanol. The product, a 50% solution in 1-hexanol, contains 8.21% zinc and 8.62% phosphorus.

EXAMPLE 10

Following the procedure of Example 1, a reaction product is prepared from 3.0 moles of propylene oxide, 3.0 moles of phosphoric acid, 7.5 equivalents of zinc oxide and 785 grams of ethylene glycol monobutyl ether. The product, a 60% solution in ethylene glycol monobutyl ether, contains 9.25% zinc and 8.95% phosphorus.

EXAMPLE 11

A propylene oxide-phosphoric acid reaction product with a 1.5:1 molar ratio of propylene oxide to phosphoric acid is prepared by a method similar to that described in Example 1. To a solution of 925 grams (5.0 moles) of this product in 925 grams of 1-hexanol is added 204 grams (5.0 equivalents) of zinc oxide. The addition takes place over a ten-minute period during which the temperature rises to 40° C. The mixture is then heated to 133–154° C. for one hour, during which time 45 grams of water is removed by distillation. An additional 45 grams of 1-hexanol is then added and the material is filtered.

There is obtained a 55% solution in 1-hexanol of the reaction product which contains 7.10% phosphorus and 6.44% zinc.

EXAMPLE 12

Following the procedure of Example 1, a 3:1 propylene oxide-phosphoric acid reaction product is prepared. A solution of two moles of this product in 607 grams of 4-methyl-2-pentanol is reacted with one mole of zinc oxide according to the procedure described in the previous examples. The product, a 50% solution in 4-methyl-2-pentanol, contains 5.22% zinc and 4.95% phosphorus.

EXAMPLE 13

A 5:1 propylene oxide-phosphoric acid reaction product is prepared by substantially the method described in Example 1. To a solution of 1.0 mole of this product in 420 grams of isohexanol is added 1.0 equivalent of zinc oxide, according to the procedure described in previous examples. The product, a 50% solution in isohexanol, contains 2.13% zinc and 2.82% phosphorus.

EXAMPLE 14

A 1:1 allyl glycidyl ether-phosphoric acid reaction product is prepared by the method of Example 1. To a solution of 424 grams (2.0 moles) of this product in 487 grams of 1-hexanol is added 81 grams (2.0 equivalents) of zinc oxide at 50° C. over 15 minutes. The mixture is heated to 140° C. and purged with nitrogen to remove water, and is then cooled and filtered. The product, a 50% solution in 1-hexanol, contains 5.68% zinc and 5.8% phosphorus.

EXAMPLE 15

Twelve hundred grams (2.0 moles) of a 75% solution, in a 2:1 (by weight) mixture of methyl isobutyl ketone and xylene, of a Bisphenol A-epichlorohydrin condensation product of molecular weight about 450 is diluted with 860 grams of isohexyl alcohol. The solution is heated to 50° C., and 196 grams (2.0 moles) of 100% phosphoric acid is added over 20 minutes, followed by 82 grams (2.0 equivalents) of zinc oxide. The mixture is heated for two hours at 110–127° C. to remove water, after which it is cooled and filtered. The resulting 50% solution contains 1.87% zinc and 2.46% phosphorus.

EXAMPLE 16

Following the procedure of Example 1, a reaction product is prepared from 780 grams (5.0 moles) of a 1:1 propylene oxide-phosphoric acid reaction product, 320 grams (5.0 equivalents) of cadmium oxide, and 1055 grams of ethylene glycol monobutyl ether. The product, a 50% solution in ethylene glycol monobutyl ether, contains, 4.70% phosphorus and 0.58% cadmium.

EXAMPLE 17

A solution of 624 grams (4.0 moles) of a 1:1 propylene oxide-phosphoric acid addition product in 668 grams of isohexanol is heated to 50° C. and 81 grams (4.0 equivalents) of magnesium oxide is added. The mixture is heated to 120° C. and a current of nitrogen is passed through to remove water; then 200 grams of xylene is added. The solution is cooled and filtered, yielding a 43% solution of a magnesium oxide-propylene oxide-phosphoric acid reaction product containing 0.28% magnesium and 6.28% phosphorus.

EXAMPLE 18

To a solution of 624 grams (4.0 moles) of a 1:1 reaction product of propylene oxide with phosphoric acid in 564 grams of 4-methyl-2-pentanol and 550 grams of 2-methylpentanol is added 151 grams (3.28 equivalents) of manganous oxide, at 50–52° C. The product is purged with nitrogen at 125–138° C. to remove water, and filtered; the product contains 0.575% manganese and 5.00% phosphorus. It is obtained as a 40% solution.

EXAMPLE 19

A solution of 428 grams (2.0 moles) of a 2:1 reaction product of propylene oxide with phosphoric acid in 520 grams of dioxane is heated to 50° C., and 92 grams (2.0 equivalents) of manganous oxide is added. The mixture is heated under reflux at 100° C. for about 1½ hours, after which time 115 grams of dioxane is added. After another hour of refluxing, an additional 145 grams of dioxane is added. Finally, the solution is filtered with the addition of 2% by weight of filter aid. The product, a 40% solution in dioxane, has a manganese content of 4.22% and a phosphorus content of 5.09%.

EXAMPLE 20

A solution of 642 grams (3.0 moles) of a 2:1 propylene oxide-phosphoric acid reaction product is dissolved in 697 grams of isohexanol and the solution is heated to 50° C. Manganous oxide, 69 grams (1.5 equivalents), is added and the mixture is heated to 120° C. and purged with nitrogen to remove water. Finally, the mixture is cooled and filtered (with the addition of 2% by weight of filter aid), yielding a product containing 2.86% manganese and 7.31% phosphorus.

EXAMPLE 21

A solution of 624 grams (4 moles) of a 1:1 propylene oxide-phosphoric acid reaction product in 490 grams of 1-hexanol is heated to 40° C. and 230 grams (4 equivalents) of manganous carbonate is added slowly over 1¼ hours as the temperature is increased to 60° C. After the addition of manganous carbonate is complete, the mixture is heated to 70° C. until gas evolution ceases. There is obtained a viscous material (60% solution in 1-hexanol) containing 5.50% manganese and 10.55% phosphorus.

EXAMPLE 22

A 1:1 propylene oxide-phosphoric acid reaction product is prepared according to the method described in Example 4, from 392 grams (4.0 moles) of phosphoric acid and 232 grams (4.0 moles) of propylene oxide. Ferric oxide, 160 grams (3 equivalents), is added at a temperature of 50° C., the mixture is blown with nitrogen at 50–130° C. to remove water and is filtered (with the addition of 3% filter aid). The product has an iron content of 3.76% and a phosphorus content of 8.43%.

EXAMPLE 23

A propylene oxide-phosphoric acid-stannous oxide reaction product is prepared by a method similar to that described in Example 9 from 2 moles of propylene oxide, 2 moles of phosphoric acid and 2 equivalents of stannous oxide. The solvent is 1-hexanol (429 grams). The product, a 50% solution, contains 0.76% tin and 5.79% phosphorus.

EXAMPLE 24

Zinc sulfide, 146 grams (3.0 equivalents), is added to a solution of 468 grams (3.0 moles) of a 1:1 propylene oxide-phosphoric acid reaction product in 563 grams of 4-methyl-2-pentanol at a temperature of 65–85° C. The reaction mixture is heated at about 130° C. for 1½ hours, the evolved hydrogen sulfide being collected by absorption in a caustic solution. It is then purged with nitrogen for 1½ hours at 125° C.; nitrogen purging is continued for an additional hour as the temperature is decreased to 85° C. The solution is treated with 3% by weight of filter aid and filtered. The product is a clear, yellow fluid (50% solution in 4-methyl-2-pentanol) of the zinc-phosphorus compound containing 1.36% zinc and 9.20% phosphorus.

EXAMPLE 25

Following the procedure of the above examples, a lithium hydroxide-propylene oxide-phosphoric acid reaction product is prepared from 168 grams (4.0 equivalents)

of lithium hydroxide and 624 grams (4.0 moles) of a 1:1 propylene oxide-phosphoric acid reaction product in 648 grams of 1-hexanol. After filtration, the product is obtained as a clear golden fluid (50% in 1-hexanol) containing 0.327% lithium and 5.25% phosphorus.

EXAMPLE 26

Aluminum isopropoxide, 136 grams (2.0 equivalents), is reacted with 372 grams (2.0 moles) of a 1.5:1 propylene oxide-phosphoric acid reaction mixture in 270 grams of 1-hexanol. The reaction is carried out at 60–65° C. for 3 hours, after which the reaction product is filtered through filter cloth. There is obtained a 50% solution which contains 1.33% aluminum and 8.27% phosphorus.

EXAMPLE 27

Following the procedure of the foregoing examples, 740 grams (4.0 moles) of a 1.5:1propylene oxide-phosphoric acid reaction product is reacted with 112 grams (4.0 equivalents) of calcium oxide in 1816 grams of 1-hexanol at 152° C. Upon filtration, there is obtained a milky liquid of low viscosity (50% in 1-hexanol) containing 2.85% calcium and 6.80% phosphorus.

EXAMPLE 28

A 1:1 styrene oxide-phosphoric acid reaction product is prepared as in Example 1. Zinc oxide, 82 grams (2.0 equivalents), is added over 15 minutes to a solution of 436 grams (2.0 moles) of this reaction product in 500 grams of 1-hexanol, at 50–62° C. Water formed in the reaction is removed by distillation under nitrogen at 70–120° C.

The residue from the distillation is filtered to remove a milky white solid which is apparently predominantly $ZnHPO_4$. The filtrate (yield 815 grams) contains 1.98% zinc and 4.74% phosphorus.

The compositions of the present invention are excellent thickening agents, especially for use as anti-sag additives in plastic caulking and sealing materials and the like. There are a wide variety of such materials, and the formulations of many of them are carefully guarded trade secrets. In general, however, they contain as essential ingredients a resinous binder, which may be a natural resin such as butyl rubber or a suitable synthetic resin, and a solid filler such as calcium carbonate, magnesium silicate or the like. Other ingredients which may be advantageous include tackifiers and adhesion improvers such as polyisobutene, phenolic resins, solid hydrocarbon resins and the like; hiding pigments such as carbon black and titanium dioxide; curing catalysts such as lead dioxide and cobalt naphthenate; plasticizers such as dioctyl phthalate, chlorinated paraffins, esters of rosin or hydrogenated rosin, and the like; and curing retarders such as stearic acid. Ideally, these sealants and caulking compositions should be thixotropic; that is, they should be viscous and resistant to flow under low shear conditions but should flow readily when subjected to high shear such as by rapid passage through a caulking gun. After application to the area being caulked, the composition should cure to a rubbery substance which remains in place but "gives" with a certain amount of flexibility when deformed.

Many caulking compositions containing the ingredients listed hereinabove have the desired thixotropic properties but "sag" when applied. That is, they have liquid-like properties and tend to "run" instead of remaining in place. To avoid this disadvantage, it is usually necessary to add an anti-sag material. Most of the materials suitable for this purpose are solids such as bentonite. While these solids have excellent anti-sag properties, they are not as convenient to measure into the formulation as are liquids. Therefore, it was unexpected and commercially significant to discover that the compositions of this invention, when present in minor amounts between about 0.5% and 25% (preferably about 0.5–5%) of the weight of the composition and most conveniently about 2–30% of the weight of the binder resin, impart excellent anti-sag properties thereto.

The anti-sag and thixotropic properties of caulking formulations containing the compositions of this invention are shown by the following tests. A butyl rubber caulking composition is prepared from the following ingredients in the indicated amounts. All parts are by weight unless otherwise indicated.

| | Parts |
|---|---|
| Butyl rubber binder (50% solution in Stoddard solvent) | 300 |
| Calcium carbonate filler | 309 |
| Magnesium silicate filler | 77.4 |
| Titanium dioxide pigment | 39 |
| Hydrocarbon resin tackifier (60% solution in Stoddard solvent) | 57 |
| Hydrogenated rosin ester plasticizer | 6.6 |
| Stoddard solvent | 44.1 |

This composition was used as a control sample; similar caulking compositions having the listed ingredients in the identical proportions and varying quantities of the products of Examples 4, 5 and 7 as anti-sag ingredients were also prepared.

The viscosity and thixotropic properties of the composition were tested by the Severs viscosity method, which involves pumping the composition through an orifice with a diameter of approximately 0.625 cm. at various pressures for various time periods. To be satisfactory as caulking materials, the compositions should have low efflux periods at low pressures and high periods at high pressures.

The "sag" properties of the compositions were evaluated by applying the composition to a metal plate through a plywood mold ¾ inch thick and containing a 1" x 4" rectangular opening. After application, the mold was immediately removed and the panel was suspended in a vertical position overnight and allowed to dry. A noticeable "sag" developed almost immediately, but the extent of further sag varied with the various compositions being treated. After standing overnight, the amount of sag in inches was measured.

The results of these tests are given in the following table.

| Caulking composition | "Sag" | Average efflux time, g./10 sec. | | | |
|---|---|---|---|---|---|
| | | 10 p.s.i. | 40 p.s.i. | 70 p.s.i. | 100 p.s.i. |
| Control | Flowed off | 0.09 | 1.10 | 3.97 | 10.58 |
| Control+20% [1] of product of Example 4 | ¾ in | 0.10 | 1.31 | 4.77 | 13.50 |
| Control+10% [1] of product of Example 5 | ⅛ in | 0.08 | 1.47 | 5.26 | 14.9 |
| Control+10% [1] of product of Example 7 | ½ in | 0.03 | 0.73 | 3.02 | 9.0 |
| Control+5% [1] of product of Example 7 | ½ in | 0.04 | 0.92 | 3.89 | 10.85 |

[1] Based on weight of binder resin.

The compositions of the present invention may also be used as ingredients in paint bases, paints or drawing compositions; as gelling agents for automotive sealants; as ingredients in trichloroethylene phosphating baths for metals; and as flame retardant materials. Further, they may be used in combination with basic reagents as foaming agents for plastics.

The utility of the compositions of this invention as additives for trichloroethylene phosphating baths is shown by the following experiment. A phosphating bath is prepared from 50 grams of 85% phosphoric acid, 244 grams of n-butyl alcohol and 10 grams of glacial acetic acid, and is diluted to 4600 grams with trichloroethylene. The solution is heated to 77° C., and a vapor-degreased steel panel is immersed therein for 5 minutes. The panel is then removed, air-dried and painted with a melamine alkyd enamel.

A similar phosphating bath is prepared and 33 grams of the product of Example 3 is added. A second steel panel is similarly immersed in this solution, dried and painted.

The panels thus treated are subjected to the Salt Fog Test (ASTM method D117–57T). In this test, the paint film on the panel is ruptured by scoring a 6-inch line on the surface of the panel. The scored panels are then placed in a cabinet containing a 5% aqueous sodium chloride solution at 35° C. Air is bubbled through the solution to produce a corrosive salt atmosphere which contacts the surface of the test panels. After exposure, the test panels are scraped with a putty knife to remove all loose paint and are then evaluated visually to determine the percentage of paint which has adhered to each panel. A second panel subjected to the test is evaluated for the tendency of corrosion to "undercut" the paint layer by measuring the distance of paint removal from the scored line and recording this distance in thirty-seconds of an inch.

After exposure in the Salt Fog chamber for 117 hours, the steel plates treated in the trichloroethylene phosphating bath as described above exhibit 65% paint adhesion and 4–10 units of "creep." By contrast, the panels treated in the phosphating solution containing the composition of Example 3 exhibits 85% paint adhesion and a "creep" rating of only 2.

What is claimed is:

1. A compound or mixture of compounds having the general formula $$O=\overset{O(R^1O)_xH}{\underset{OM}{\overset{|}{P}-OR^2}}$$

wherein $R^1$ is an ethylene or methylethylene radical; $R^2$ is hydrogen, one equivalent of a metal cation or $(R^1O)_xH$; M is one equivalent of a metal cation; and $x$ is an integer from 2 to about 5.

2. A compound or mixture of compounds according to claim 1 wherein $R^1$ is $$-CH_2CH-\atop\underset{CH_3}{|}$$

and M is zinc.

3. A compound or mixture of compounds according to claim 1 having the general formula $$O=\overset{O(R^1O)_xH}{\underset{OM}{\overset{|}{P}-OH}}$$

4. A compound or mixture of compounds according to claim 3 wherein $R^1$ is $$-CH_2CH-\atop\underset{CH_3}{|}$$

and M is zinc.

5. A method for the preparation of a compound or mixture of compounds according to claim 1 which comprises (1) reacting one mole of phosphoric acid with up to about 5 equivalents of an organic epoxide, and (2) reacting the product thus formed with about 0.4–2.0 equivalents of a metal base.

6. The method of claim 5 wherein the metal is zinc, manganese, cadmium, aluminum, iron, tin, lithium or an alkaline earth metal.

7. The method of claim 5 wherein the metal is zinc.

8. The method of claim 7 wherein the epoxide is propylene oxide.

9. A method according to claim 5 which comprises reacting one mole of phosphoric acid with about 1–2.5 equivalents of propylene oxide, and thereafter reacting the product thus formed with about 0.8–1.0 equivalent of zinc oxide.

References Cited

UNITED STATES PATENTS

| | | | |
|---|---|---|---|
| 2,346,155 | 4/1944 | Denison et al. | 260—429.9 XR |
| 2,409,774 | 10/1946 | Mack | 260—429.9 XR |
| 2,488,662 | 11/1949 | Farrington et al. | 260—429.9 |
| 2,790,765 | 4/1957 | Otto | 260—429.9 XR |
| 2,905,683 | 9/1959 | Goldsmith | 260—429.9 XR |
| 3,004,996 | 10/1961 | Arakelian et al. | 260—429.9 |
| 3,061,506 | 10/1962 | Nunn et al. | 260—950 XR |
| 3,133,787 | 5/1964 | Kelly | 260—950 XR |
| 3,215,715 | 11/1965 | Wurstner | 260—429.9 |
| 3,259,579 | 7/1966 | Rogers et al. | 260—429.9 XR |
| 3,341,633 | 9/1967 | Asseff | 260—429.9 XR |
| 2,372,244 | 3/1945 | Adams et al. | 260—953 |
| 2,830,069 | 4/1958 | Smith | 260—953 |

OTHER REFERENCES

Chemical Abstracts, vol. 62, pp. 7962h–7963b (1965) (corresponding French patent No. 1,365,331).

Carré: Annales de Chim. et Phys. [8] vol. 5, pp. 351–57, 364 (1905) (copy in Scientific Library QD–1–A61).

Atherton et al.: J. Chem. Soc. (1945), p. 385 (copy in Scientific Library QD–1–C6). Bull. Soc. Chim. France, vol. 31, pp. 848–49, 853–55, 859–61 (1922) (copy in 260/953).

Compt. Rend., vol. 206, p. 1902 (1938) (copy in 260/953).

TOBIAS E. LEVOW, Primary Examiner

H. M. S. SNEED, Assistant Examiner

U.S. Cl. X.R.

260—448, 439, 937, 429.7, 429, 950, 978, 987, 760, 761, 762, 41.5, 953, 928, 933, 988